UNITED STATES PATENT OFFICE 2,467,927

PREPARATION OF MONOMERIC ALKYL ALPHA-CYANO-ACRYLATES

Alan E. Ardis, Akron, Ohio, assignor to The B. F. Goodrich Company, New York, N. Y., a corporation of New York No Drawing. Application May 29, 1947, Serial No. 751,471

8 Claims. (Cl. 260—465.4)

This invention relates to alkyl esters of alpha-cyano-acrylic acid and to a method of preparing them.

Alkyl esters of alpha-cyano-acrylic acid have heretofore been obtained in the polymeric form by pyrolysis of the cyanhydrin acetates of acetyl fatty acid esters. It has now been found that alkyl esters of alpha-cyano-acrylic acid may be obtained in the monomeric form by reacting an alkyl cyano-acetate with formaldehyde in aqueous solution in the presence of a basic condensation catalyst.

According to the present invention, an alkyl cyano-acetate is reacted with formaldehyde by adding the formaldehyde solution to the alkyl cyano-acetate or, preferably, by adding the alkyl cyano-acetate (containing the catalyst) to the formaldehyde solution. The aqueous formaldehyde solution may be of any strength, but the commercial solution known as formalin, usually containing from 33 to 40% by weight of formaldehyde is to be preferred.

The alkyl cyano-acetate used in the reaction of this invention determines the particular alpha-cyano-acrylate to be obtained, for the alkyl group on the cyano-acetate is not altered in the reaction. The alkyl group on the cyano-acetate molecule may be a straight carbon chain alkyl group such as the methyl, ethyl; n-propyl, n-butyl, n-amyl, n-octyl, n-dodecyl groups and the like, or it may be a branched carbon chain alkyl group such as the isopropyl group, the isobutyl group, isoamyl group, isohexyl group, 2-ethyl hexyl group or the like.

The basic condensation catalyst which promotes the reaction between formaldehyde and the alkyl cyano-acetate may be any basic material including the inorganic bases such as sodium or potassium hydroxide, ammonia or ammonium hydroxide and also organic bases such as quinoline, piperidine, isoquinoline, and pyrrolidene, and the dialkyl amines such as diethyl amine, and the like. The preferred catalysts are the secondary amines, particularly diethylamine, and piperidine.

The reaction between the alkyl cyano-acetate and formaldehyde is preferably conducted with vigorous stirring at a temperature not higher than 90° C., preferably 80 to 85° C. or lower. The reaction is preferably initiated by heating one of the reactants to 50 to 60° C. before starting the addition of the other ingredient. Since the reaction is mildly exothermic, it may be necessary to provide a means of cooling the reaction after substantial portions of the reactants have been intermingled. After the reaction has subsided, the reaction mixture should be heated and stirred for a short period to insure completeness of reaction.

The products of the condensation reaction will be principally the crude alpha-cyano-acrylic acid ester, partially in polymeric form, and water. After cooling the reaction mixture, the watery supernatant layer may be decanted and the crude ester separated from impurities by dissolving it in an appropriate solvent such as acetone, ether, nitromethane or the like.

Pure monomeric alkyl esters of alpha-cyano-acrylic acid are best obtained from the crude ester by vacuum distillation, the distillation preferably being accomplished under high vacuum of the order of one to ten millimeters of mercury pressure or less. For example, solution of the crude ester in solvent is dried over chemical drying agents such as anhydrous sodium sulfate, phosphorous pentoxide and the like. The dried solution of the ester is then subjected to vacuum evaporation to remove the solvent. Distillation of the crude ester is preferably performed in the presence of an inhibiting substance exhibiting an acid reaction such as picric acid, nitric oxide gas (NO), phosphorous pentoxde, tertiary butyl catechol, metaphosphoric acid, maleic anhydride, maleic acid, antimony pentoxide, ferric chloride, and others. In this manner decomposition of the monomer may be reduced and excellent yields obtained. Since the crude alpha-cyano acrylate is obtained in the reaction mixture as a low molecular weight polymer, distillation of crude product is accompanied by simultaneous depolymerization of the polymer to form more monomer. The preferred inhibiting substances, particularly phosphorous pentoxide need be present only in catalytic amounts of 0.1 to 0.2%, though generally 1 to 10% by weight of phosphorous pentoxide is sufficient to inhibit further polymerization in the distillation vessel or in the monomer receiver.

The monomeric alkyl esters of alpha-cyano-acrylic acid polymerize very readily, in fact, the lower members of the series such as the methyl and ethyl esters polymerize spontaneously. Methyl-alpha-cyano-acrylate undergoes autopolymerization in the vapor state so that special precautions are necessary in order to inhibit such autopolymerization and to obtain the ester in the monomeric form. It has been found that certain gaseous substances are excellent inhibitors for the polymerization so that it is possible to introduce the gaseous inhibitor into the distillation vessel directly above the surface of the distilland. The preferred gaseous inhibitor, nitric oxide (NO), inhibits autopolymerization of the alpha-cyano-acrylates in the vapor phase and, furthermore, is sufficiently soluble in the liquid alpha-cyano-acrylates that the condensed distillate contains sufficient nitric oxide that it will not polymerize on the condensing surfaces or in the receiver.

The monomeric alkyl esters of alpha-cyano-acrylic acid as obtained by the method of this invention are extremely useful for the production of hard, clear, glass-like resins. The polymerized alkyl esters of alpha-cyano-acrylic acid are outstanding in their exceedingly high melting points (130° C. or above). Since these esters polymerize so readily, it is necessary only to warm the monomer (stabilized with NO gas or picric acid) to a temperature slightly above room temperature (50 to 100° C.) to accomplish polymerization. A small amount (approximately 0.1%) of one of the conventional peroxygen type compounds such as benzoyl or caprylyl peroxide added to monomeric alpha-cyano-acrylates containing phosphorous pentoxide will produce a smooth polymerization when the monomer is heated to a temperature between 60 and 90° C.

The polymeric alkyl esters of alpha-cyano-acrylic acid may be purified by recrystallization from a solution in a solvent. For example, polymeric isobutyl alpha-cyano-acrylate may be purified by precipitating the polymer from an ether solution with hexane.

The following examples illustrate the manner in which the invention may be carried into effect.

Example I 56 grams (0.5M) of ethyl-cyano-acetate containing 3 drops of piperidine were added in a dropwise manner to 40.5 grams (0.5M) of a formalin solution (37% HCHO) and the mixture warmed to 60° C. The rate of dropwise addition was regulated to hold the temperature around 80° C. After the addition of the ethyl-cyano-acetate was complete, the reaction mixture was stirred and heated at 80° C. for one hour. The reaction mixture upon cooling separated into a thick, viscous mass and a watery supernatant layer. The supernatant layer was discarded.

The residue was dissolved in acetone and the acetone solution was dried over anhydrous sodium sulfate. The acetone was evaporated under vacuum. 3 grams of phosphorous pentoxide was added to the residue remaining after the removal of the acetone and vacuum distillation continued. Monomeric ethyl-alpha-cyano-acrylate distilled off at 76–93° C. at 10 mm. Hg pressure. The boiling point of 76 to 93° C. is not a true boiling point because of the higher temperature necessary to depolymerize the ester. The monomer was collected in a receiver containing about two grams of phosphorous pentoxide. The resulting monomeric ester was a fluid, clear, water-white material which polymerized to a hard, clear, glass-like resin when 0.1% of benzoyl peroxide was added and the monomer was warmed to a temperature of 60 to 95° C.

The monomeric ethyl-alpha-cyano-acrylate prepared in Example I had a freezing point of −20 to −25° C. and upon analysis was found to contain 11.21% nitrogen, 57.4% carbon and 5.64% hydrogen (theoretical for ethyl-alpha-cyano-acrylate is 11.20% nitrogen, 57.59% carbon and 5.64% hydrogen). The hard polymer prepared from the monomer had a softening point of 150 to 160° C. and was soluble in acetone but insoluble in alcohol and ether.

Example II 97.5 grams of methyl-cyano-acetate (.98M) containing about 3 drops of piperidine was added in a dropwise manner to 73 grams (.98M) of formalin (containing 40.3% formaldehyde) with vigorous agitation. The formalin solution was warmed to 60° C. to start the reaction. The dropwise addition of the methyl-cyano-acetate was adjusted so as to control the temperature of the reaction at or about 80° C. After the addition of the methyl-cyano-acetate was complete the reaction mixture was heated at 80° C. with stirring for 1 hour in order to insure completion of the reaction. After cooling, the reaction mixture separated into a viscous mass and a watery supernatant layer. The watery layer was discarded and the viscous mass dissolved in acetone.

The acetone solution was dried over phosphorous pentoxide and the acetone removed by vacuum evaporation. The residue remaining after the solvent removal was distilled under vacuum in the presence of nitric oxide gas and the monomeric alpha-cyano-acrylate distilling over at 150° C. and 1 mm. Hg pressure (not a true boiling point due to the higher temperature necessary for depolymerization) was collected in a receiver containing 2 grams of phosphorous pentoxide. The structure of the methyl-alpha-cyano-acrylate and its existence in the monomeric form was confirmed by the Diels-Alder reaction as follows:

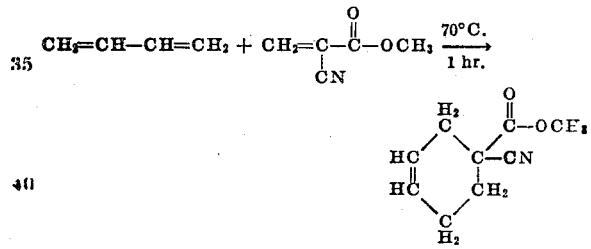

The nitrogen content of the reaction product was found to be 8.16% (theoretical 8.48%).

Methyl-alpha-cyano-acrylate prepared as in Example II polymerizes when the frozen monomer (containing no inhibitor of polymerization) is melted. The monomeric methyl-alpha-cyano-acrylate prepared in Example II and containing phosphorous pentoxide was polymerized by warming to 95° C. with 0.1% benzoyl peroxide to a hard, clear, glass-like resin having a softening point of 165° C. and a melting point of 200 to 205° C. The resulting polymerizate was soluble in acetone and nitroethane but was insoluble in alcohol and ether (recrystallized once-polymerized polymer is only slightly soluble in acetone).

Example III

Isobutyl alpha-cyano-acrylate was prepared by the method of Examples I and II. The viscous mass remaining after the reaction was dissolved in acetone and distilled under vacuum, using picric acid in the distillation vessel to inhibit polymerization. The main fraction consisting of the isobutyl alpha-cyano-acrylate distilled over at 160 to 170° C. and 2 mm. Hg pressure and was collected in a receiver containing a small amount of picric acid.

The monomeric isobutyl alpha-cyano-acrylate prepared in Example III polymerized in 15 min. at 95° C. to a hard, clear, glass-like resin. It was found that the hard polymeric isobutyl alpha-cyano-acrylate softened at 105° C., melted at 130 to 135° C. and was soluble in ether, alcohol and acetone. A convenient method of further purifying the polymer consists in precipitating the polymer from an ether solution by the addition of hexane.

While I have disclosed certain preferred manners of performing my invention, I do not thereby desire or intend to limit myself solely thereto, for the precise proportions of the materials utilized may be varied and equivalent chemical materials may be employed, if desired, without departing from the spirit and scope of the invention as defined in the appended claims.

I claim:

1. Monomeric alkyl esters of alpha-cyano-acrylic acid containing phosphorous pentoxide as a stabilizer.
2. Monomeric methyl - alpha - cyano-acrylate containing phosphorous pentoxide as a stabilizer.
3. Monomeric ethyl-alpha-cyano-acrylate containing phosphorous pentoxide as a stabilizer.
4. Monomeric isobutyl alpha-cyano-acrylate containing phosphorous pentoxide as a stabilizer.
5. The method of preparing a monomeric alkyl ester of alpha-cyano-acrylic acid which comprises bringing together an alkyl cyanoacetate and an aqueous solution of formaldehyde in the presence of a basic condensation catalyst and at a temperature of about 50 to 90° C. whereupon chemical reaction occurs to form a reaction mixture containing a water phase and a water-immiscible phase containing a crude, partially polymerized alkyl ester of alpha-cyano-acrylic acid, separating the water-immiscible phase from the water phase and distilling the water-immiscible phase under reduced pressure to depolymerize the said partially polymerized ester and obtain the said ester in monomeric form, and maintaining the said monomeric ester in contact with phosphorous pentoxide to prevent repolymerization thereof.
6. The method of claim 5 wherein the alkyl cyanoacetate is methyl cyanoacetate, the monomeric ester of alpha-cyano acrylic acid obtained being methyl cyanoacetate.
7. The method of claim 5 wherein the alkyl cyanoacetate is ethyl cyanoacetate, the monomeric ester of alpha-cyano acrylic acid obtained being ethyl cyanoacetate.
8. The method of claim 5 wherein the alkyl cyanoacetate is isobutyl cyanoacetate, the monomeric ester of alpha-cyano acrylic acid obtained being isobutyl cyanoacetate.

ALAN E. ARDIS.

REFERENCES CITED

The following references are of record in the file of this patent:

UNITED STATES PATENTS

| Number | Name | Date |
| --- | --- | --- |
| 2,150,154 | Cope | Mar. 14, 1939 |
| 2,293,969 | Crawford et al. | Aug. 25, 1942 |
| 2,386,586 | Brant et al. | Oct. 9, 1945 |

FOREIGN PATENTS

| Number | Country | Date |
| --- | --- | --- |
| 696,318 | Germany | Sept. 18, 1940 |
| 703,952 | Germany | Mar. 20, 1941 |

OTHER REFERENCES

Enkvist et al., Chem. Abstracts, vol. 33, cols. 6314–6315 (1939).

Mannich et al., Ber. Deut. Chem., vol. 55, pages 3503–3504 (1922).

Mannich et al. and others, Beilstein (4th ed.), vol. 2, 2nd suppl., pages 530, 531, 532, 535 (1942).